US011532819B2

(12) United States Patent
Nakayama et al.

(10) Patent No.: US 11,532,819 B2
(45) Date of Patent: Dec. 20, 2022

(54) ELECTRODE BINDER RESIN COMPOSITION, ELECTRODE MIX PASTE, AND ELECTRODE

(71) Applicant: UBE CORPORATION, Ube (JP)

(72) Inventors: Takeshige Nakayama, Ube (JP); Tetsuo Sakai, Yonezawashi (JP); Masanori Morishita, Yonezawashi (JP)

(73) Assignee: UBE Corporation, Ube (JP)

( * ) Notice: Subject to any disclaimer, the term of this patent is extended or adjusted under 35 U.S.C. 154(b) by 0 days.

(21) Appl. No.: 17/057,464

(22) PCT Filed: May 23, 2019

(86) PCT No.: PCT/JP2019/020547
§ 371 (c)(1),
(2) Date: Apr. 2, 2021

(87) PCT Pub. No.: WO2019/225717
PCT Pub. Date: Nov. 28, 2019

(65) Prior Publication Data
US 2022/0109158 A1 Apr. 7, 2022

(30) Foreign Application Priority Data
May 24, 2018 (JP) .............................. JP2018-099611

(51) Int. Cl.
H01M 4/62 (2006.01)
C08G 73/10 (2006.01)
C08L 79/08 (2006.01)
H01M 4/04 (2006.01)
H01M 10/0525 (2010.01)

(52) U.S. Cl.
CPC ........ H01M 4/622 (2013.01); C08G 73/1007 (2013.01); C08L 79/08 (2013.01); H01M 4/0404 (2013.01); H01M 4/0471 (2013.01); H01M 10/0525 (2013.01)

(58) Field of Classification Search
CPC .. H01M 4/622; H01M 4/0404; H01M 4/0471; H01M 10/0525; H01M 4/133; H01M 4/386; H01M 4/131; H01M 4/134; H01M 4/1391; H01M 4/1393; H01M 4/1395; H01M 4/387; H01M 4/483; H01M 4/583; H01M 4/623; H01M 4/139; H01M 4/38; C08G 73/1007; C08G 73/10; C08L 79/08; C08L 1/286; C08L 1/02; C08L 5/04; C08L 29/04; C08L 39/06; C08L 71/02; C08L 101/00; C08K 3/08; C08K 3/36; C08K 3/04; C09D 129/04; Y02E 60/10; H01G 11/38; H01G 11/86
USPC .......................................... 429/217
See application file for complete search history.

(56) References Cited

U.S. PATENT DOCUMENTS

| 5,468,571 A | 11/1995 | Fujimoto et al. |
| 2008/0131783 A1 | 6/2008 | Choi et al. |
| 2010/0266902 A1 | 10/2010 | Takano et al. |
| 2013/0177807 A1 | 7/2013 | Lee et al. |
| 2016/0137787 A1* | 5/2016 | Oka .................. C08G 73/1078 528/184 |
| 2018/0026270 A1 | 1/2018 | Bae et al. |
| 2018/0226677 A1 | 8/2018 | Nishiura et al. |
| 2018/0254476 A1 | 9/2018 | Fujimara |
| 2020/0172731 A1 | 6/2020 | Nakayama et al. |

FOREIGN PATENT DOCUMENTS

| CN | 106129415 A | 11/2016 |
| EP | 3514869 A1 | 7/2019 |
| JP | H 06-163031 | 6/1994 |
| JP | 2000-348730 A | 12/2000 |
| JP | 2007-095670 A | 4/2007 |
| JP | 2008-135384 A | 6/2008 |
| JP | 2013-143382 A | 7/2013 |
| JP | 2014-078416 A | 5/2014 |
| JP | 2015-034289 A | 2/2015 |
| TW | 201334269 | 8/2013 |
| WO | WO 2013/114788 A1 | 8/2013 |
| WO | WO 2016/136543 A1 | 9/2016 |
| WO | WO 2017/022796 A1 | 8/2017 |

OTHER PUBLICATIONS

Office Action in Chinese Application No. 201980046784.2 dated May 8, 2021.
Office Action in Korean Application No. 10-2020-7037159 dated May 11, 2021.
Office Action in Taiwanese Application No. 108117773 dated Apr. 8, 2021.
International Preliminary Report on Patentability issued in International Application No. PCT/JP/020547 dated May 23, 2019.
Extend European Search Report in European Patent Application No. 19807891.7, dated Jan. 27, 2022.

* cited by examiner

Primary Examiner — Gary D Harris
(74) Attorney, Agent, or Firm — Knobbe, Martens, Olson & Bear LLP

(57) ABSTRACT

An electrode binder resin composition containing a polyamic acid, a water-soluble polymer other than the polyamic acid, and a solvent. The use of the electrode binder resin composition improves cyclic characteristics.

16 Claims, No Drawings

ELECTRODE BINDER RESIN COMPOSITION, ELECTRODE MIX PASTE, AND ELECTRODE

TECHNICAL FIELD

The present invention relates to an electrode binder resin composition of electrochemical elements such as lithium ion secondary batteries and electric double layer capacitors.

BACKGROUND ART

Since the lithium ion secondary battery has a high energy density and a high capacity, it is widely used as a drive power source for mobile information terminals. In recent years, its use in industrial applications, such as installation in electric/hybrid automobiles that require a large capacity, are widely spreading, and studies for further increasing capacity and performance have been made. One of the attempts is to increase the charge/discharge capacity by using, for example, silicon, tin or an alloy containing these, which are capable of storing a large amount of lithium per unit volume.

However, active materials having a large charge/discharge capacity such as silicon, tin, or an alloy containing these cause a very large volume change associated with charge/discharge. When a general-purpose binder such as polyvinylidene fluoride or a rubber-based resin is used for the electrode containing such an active material, the active material layer is destroyed or the interface between the current collector and the active material layer is peeled off due to the volume change, leading to a problem that the cycle characteristics of the battery are deteriorated. In order to develop a battery having a high energy density and excellent cycle characteristics, a binder that solves the above-mentioned problems is required.

As described in Patent Document 1, it is known that an aromatic polyimide obtained from an aromatic tetracarboxylic dianhydride and an aromatic diamine is used as an electrode binder for a lithium ion secondary battery. Since aromatic polyimide has poor solubility in organic solvents, usually (also in Patent Document 1), using an organic solvent solution of polyamic acid, which is a polyimide precursor, an electrode mixture paste is prepared by mixing it with an electrode active material, and applied onto a current collector, and then heated at a high temperature (350° C. in Patent Document 1) to dehydrate and ring-close (imidization) to form an electrode layer.

On the other hand, environmentally friendly water-soluble binders have also been developed. Patent Document 2 describes a polyimide binder obtained from an aqueous polyamic acid solution containing imidazoles. Further, Patent Document 3 describes a binder containing a water-soluble polymer such as polyacrylic acid or carboxymethyl cellulose.

Further, Patent Document 4 describes a negative electrode mixture prepared by using a binder solution in which polyamic acid and polyacrylic acid are dissolved in N-methyl-2-pyrrolidone.

CITATION LIST

Patent Document

Patent Document 1: Japanese Patent Laid-Open Publication No. H6-163031

Patent Document 2: Japanese Patent Laid-Open Publication No. 2014-78416

Patent Document 3: Japanese Patent Laid-Open Publication No. 2000-348730

Patent Document 4: Japanese Patent Laid-Open Publication No. 2007-95670

SUMMARY OF THE INVENTION

Technical Problem

As described above, various binders have been proposed, but in order to achieve better cycle characteristics, further improvement of the binder suitable for the electrode active material that causes a large volume change is required. The present invention has been made in view of the above circumstances, and an object of the present invention is to provide an electrode binder resin composition that improves cycle characteristics.

Solution to Problem

The present invention particularly relates to the following items.

1. An electrode binder resin composition, comprising a polyamic acid, a water-soluble polymer other than the polyamic acid, and a solvent comprising water.

2. An electrode binder resin composition, comprising a polyamic acid, a water-soluble polymer other than the polyamic acid with the proviso that polyacrylic acid is excluded, and a solvent.

3. The electrode binder resin composition according to the above item 1 or 2, wherein the polyamic acid comprises a repeating unit represented by following chemical formula (I).

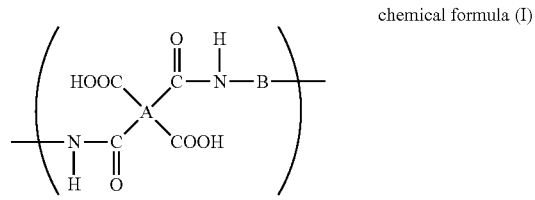

chemical formula (I)

(in chemical formula (I),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.)

4. The electrode binder resin composition according to the above item 3, wherein the polyamic acid consists of a repeating unit represented by following chemical formula (II).

chemical formula (II)

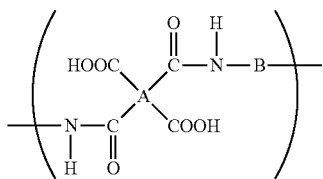

(in chemical formula (II),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine having a solubility of 0.1 g/L or more in water at 25° C., a divalent group obtainable by removing amino groups from an aliphatic diamine having a molecular weight of 500 or less, and a divalent group obtainable by removing amino groups from a fluorine-containing aromatic diamine.)

5. The electrode binder resin composition according to any one of the above items 1 to 3, wherein the polyamic acid consists of a repeating unit represented by following chemical formula (III).

chemical formula (III)

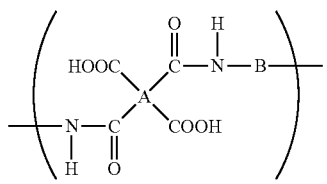

(in chemical formula (III), A is a tetravalent group obtainable by removing carboxyl groups from an aromatic tetracarboxylic acid, and comprises at least any one of tetravalent groups represented by following chemical formulas (III-2) to (III-4); and B is a divalent group having 1 to 4 aromatic rings.

chemical formula (III-2)

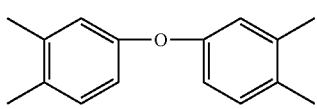

chemical formula (III-3)

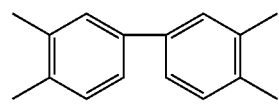

chemical formula (III-4)

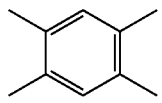

6. The electrode binder resin composition according to the above item 2, wherein the solvent is an organic solvent.

7. The electrode binder resin composition according to the above item 1, wherein the water-soluble polymer is selected from the group consisting of a water-soluble cellulose derivative, polyacrylic acid, polymethacrylic acid, polyvinyl alcohol, polyalkylene glycol, polyvinylpyrrolidone, polysulfonic acid, salts thereof, and alginic acid salt.

8. The electrode binder resin composition according to the above item 2, wherein the water-soluble polymer is selected from the group consisting of a water-soluble cellulose derivative, polyvinyl alcohol, polyalkylene glycol, polyvinylpyrrolidone, polysulfonic acid, salts thereof, and alginic acid salt.

9. The electrode binder resin composition according to any one of the above items 1 to 8, wherein the mass ratio of the polyamic acid to the water-soluble polymer (polyamic acid:water-soluble polymer) is in a range of 10:90 to 90:10.

10. An electrode comprising a polyimide, a water-soluble polymer other than polyamic acid with proviso that polyacrylic acid is excluded, and an electrode active material.

11. The electrode according to the above item 10, wherein the polyimide is a polyimide obtained from a polyamic acid consisting of a repeating unit represented by following chemical formula (I).

chemical formula (I)

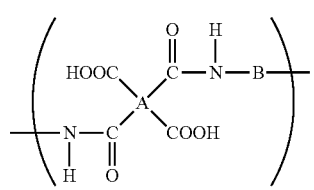

(in chemical formula (I),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.)

12. The electrode according to the above item 10 or 11, wherein the electrode active material is carbon powder, silicon powder, tin powder, an oxide powder of silicon or tin, or alloy powders comprising silicon or tin.

13. A lithium ion secondary battery comprising the electrode according to any one of the above items 10 to 12.

14. A method for producing an electrode, comprising: applying an electrode mixture paste comprising the electrode binder resin composition according to any one of the above items 1 to 9 and an electrode active material to a current collector, and then heat-treating the electrode mixture paste at 200° C. or lower to remove the solvent and perform imidization reaction of the polyamic acid.

In addition to the above, the application also discloses at least the following items.

1. An electrode binder resin composition containing a polyamic acid, a water-soluble polymer other than the polyamic acid, and a solvent.

2. The electrode binder resin composition according to the above item 1, wherein the polyamic acid consists of a repeating unit represented by following chemical formula (I).

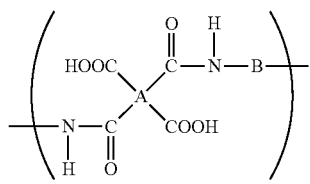

chemical formula (I)

In chemical formula (I),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.

3. The electrode binder resin composition according to the above item 2, wherein the polyamic acid consists of a repeating unit represented by following chemical formula (II).

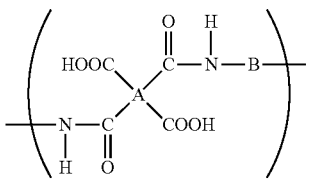

chemical formula (II)

In chemical formula (II),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine having a solubility of 0.1 g/L or more in water at 25° C., a divalent group obtainable by removing amino groups from an aliphatic diamine having a molecular weight of 500 or less, and a divalent group obtainable by removing amino groups from a fluorine-containing aromatic diamine.

4. The electrode binder resin composition according to the above item 3, wherein the solvent comprises water.

5. The electrode binder resin composition according to any one of the above item 1 or 2, wherein the polyamic acid consists of a repeating unit represented by following chemical formula (III).

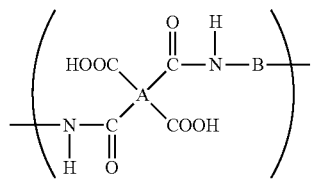

chemical formula (III)

In chemical formula (III), A is a tetravalent group obtainable by removing carboxyl groups from an aromatic tetracarboxylic acid, and comprises at least any one of tetravalent groups represented by following chemical formulas (III-2) to (III-4); and B is a divalent group having 1 to 4 aromatic rings.

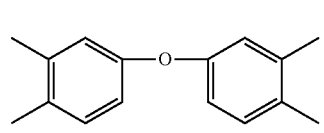

chemical formula (III-2)

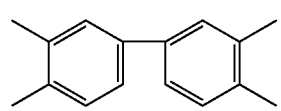

chemical formula (III-3)

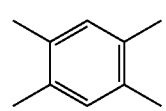

chemical formula (III-4)

6. The electrode binder resin composition according to the above items 1, 2, and 5, wherein the solvent is an organic solvent.

7. The electrode binder resin composition according to any one of the above items 1 to 6, wherein the water-soluble polymer is selected from the group consisting of a water-soluble cellulose derivative, polyacrylic acid, polymethacrylic acid, polyvinyl alcohol, polyalkylene glycol, polyvinylpyrrolidone, polysulfonic acid, salts thereof, and alginic acid salt.

8. The electrode binder resin composition according to any one of the above items 1 to 7, wherein the mass ratio of the polyamic acid to the water-soluble polymer (polyamic acid:water-soluble polymer) is in a range of 10:90 to 90:10.

9. An electrode comprising a polyimide, a water-soluble polymer other than polyamic acid, and an electrode active material.

10. The electrode according to the above item 9, wherein the polyimide is a polyimide obtained from a polyamic acid consisting of a repeating unit represented by following chemical formula (I).

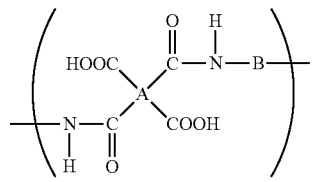

chemical formula (I)

In chemical formula (I),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.

11. The electrode according to the above item 9 or 10, wherein the electrode active material is carbon powder, silicon powder, tin powder, an oxide powder of silicon or tin, or alloy powders comprising silicon or tin.

12. A lithium ion secondary battery comprising the electrode according to any one of the above items 9 to 11.

13. A method for producing an electrode, comprising applying an electrode mixture paste comprising the electrode binder resin composition according to any one of the above items 1 to 8 and an electrode active material to a current collector, and then heat-treating the electrode mixture paste at 200° C. or lower to remove the solvent and perform imidization reaction of the polyamic acid.

According to the present invention, provided is an electrode binder resin composition that improves cycle characteristics.

The electrode binder resin composition of the present invention comprises a polyamic acid. The polyamic acid is not particularly limited, and a known polyamic acid used for the electrode binder may be used.

For example, a polyamic acid consisting of repeating units represented by the above chemical formula (I) is preferable. Among these, a polyamic acid consisting of a repeating unit represented by the above chemical formula (II) is particularly preferable. By using a polyamic acid consisting of a repeating unit represented by the chemical formula (II), water having good environmental adaptability can be used as a solvent. The polyamic acid is obtained by reacting a tetracarboxylic acid component (tetracarboxylic dianhydride) with a diamine component, and the tetracarboxylic acid component forms a tetravalent group obtainable by removing carboxyl groups from a tetracarboxylic acid, and a diamine component forms a divalent group obtainable by removing amino groups from the diamine. Namely, using one or more selected from the group consisting of fluorine-free aromatic tetracarboxylic dianhydrides, aliphatic tetracarboxylic dianhydride, and fluorine-containing aromatic tetracarboxylic dianhydrides, as a tetracarboxylic acid component, a polyamic acid consisting of repeating units represented by the chemical formula (I) or the chemical formula (II) can be prepared.

The fluorine-free aromatic tetracarboxylic acid preferably has 2 to 3 aromatic rings. Preferable examples of the fluorine-free aromatic tetracarboxylic acid include 3,3',4,4'-biphenyltetracarboxylic dianhydride and 2,3,3',4'-biphenyltetracarboxylic dianhydride, 2,2',3,3'-biphenyltetracarboxylic dianhydride, pyromellitic dianhydride, benzophenonetetracarboxylic dianhydride, 4,4'-oxydiphthalic dianhydride, diphenylsulfonetetracarboxylic dianhydride, p-terphenyltetracarboxylic dianhydride, m-terphenyltetracarboxylic dianhydride and the like.

As the aliphatic tetracarboxylic dianhydride, an alicyclic tetracarboxylic dianhydride is preferable, and for example, a dianhydride of tetracarboxylic acid in which four carboxyl groups are directly bonded to an alicyclic group is preferable. Specific preferable examples of the aliphatic tetracarboxylic dianhydrides include, for example, cyclobutane-1, 2,3,4-tetracarboxylic dianhydride, 1,2,4,5-cyclohexanetetracarboxylic dianhydride, dicyclohexyl-3,3', 4,4'-tetracarboxylic dianhydride, 1,2,4,5-cyclohexanetetracarboxylic-1,2:4,5-dianhydride, 1,2,3,4-cyclobutanetetracarboxylic dianhydride, bicyclo[2.2.2]octo-7-ene-2,3;5,6-tetracarboxylic dianhydride and the like.

Preferable examples of the fluorine-containing aromatic tetracarboxylic dianhydride include 4,4'-(hexafluoroisopropylidene)diphthalic anhydride, 3,3'-(hexafluoroisopropylidene)diphthalic anhydride, 5,5'-[2,2,2-trifluoro-1-[3-(trifluoromethyl)phenyl]ethylidene]diphthalic anhydride, 5,5'-[2,2,3,3,3-pentafluoro-1-(trifluoromethyl)propylidene]diphthalic anhydride, 1H-difluoro [3,4-b:3',4'-i]xanthene-1,3,7,9(11H)-tetrone, 5,5'-oxybis[4,6,7-trifluoro-pyromellitic anhydride], 3,6-bis(trifluoromethyl)pyromellitic dianhydride, 4-(trifluoromethyl)pyromellitic dianhydride, 1,4-difluoropyromellitic dianhydride, 1,4-bis(3,4-dicarboxytrifluorophenoxy) tetrafluorobenzene dianhydride, and the like.

Each of the fluorine-free aromatic tetracarboxylic acid, the aliphatic tetracarboxylic dianhydride and the fluorine-containing aromatic tetracarboxylic dianhydride does not have to be one kind, and it may be a mixture of two or more kinds.

In one embodiment (particularly, when the solvent contains water, for example, when the solvent contains water in an amount of 50% by mass or more), as the fluorine-free aromatic diamine, those having a solubility of 0.1 g/L or more in water at 25° C. are preferable, and aromatic diamines having 1 to 2 aromatic rings are more preferable. When an aromatic diamine having a solubility of less than 0.1 g/L in water at 25° C. is used, it may be difficult to obtain a uniformly dissolved electrode binder resin composition when water is used as a solvent. Further, when the aromatic diamine has more than two aromatic rings, the solubility in water at 25° C. may be less than 0.1 g/L, and as a result, it may be difficult to obtain a uniformly dissolved electrode binder resin composition when water is used as a solvent.

In one embodiment (particularly, when the solvent contains water, for example, when the solvent contains water in an amount of 50% by mass or more), as the aliphatic diamine, those having a molecular weight of 500 or less (molecular weight in the case of a monomer, and weight-average molecular weight in the case of a polymer) are preferable, and aliphatic diamines having a solubility of 0.1 g/L or more in water at 25° C., or alicyclic diamines having one or two aliphatic rings are more preferable. When an aliphatic diamine having a molecular weight of more than 500 is used, it may be difficult to obtain a uniformly dissolved electrode binder resin composition when water is used as a solvent.

The fluorine-containing aromatic diamine is not particularly limited, but a fluorine-containing aromatic diamine having one or two aromatic rings is preferable. When the fluorine-containing aromatic diamine has more than two aromatic rings, it may be difficult to obtain a uniformly dissolved electrode binder resin composition when water is used as a solvent.

Preferable examples of the fluorine-free aromatic diamine include p-phenylenediamine (solubility is 120 g/L in water at 25° C.; the same applies hereafter), m-phenylenediamine (77 g/L), 4,4'-diaminodiphenyl ether (0.19 g/L), 3,4'-diaminodiphenyl ether (0.24 g/L), 4,4'-diaminodiphenylmethane (0.54 g/L), 2,4-toluenediamine (62 g/L), 3, 3'-dihydroxy-4,4'-diaminobiphenyl (1.3 g/L), bis(4-amino-3-carboxyphenyl)methane (200 g/L), 2,4-diaminotoluene (62 g/L), and the like. Since it is highly water-soluble and the resulting polyimide has excellent properties, preferred are p-phenylenediamine, m-phenylenediamine, 4,4'-diaminodiphenyl ether, 3,4'-diaminodiphenyl ether, and mixtures thereof, and more preferred are p-phenylenediamine, 4,4'-diaminodiphenyl ether, and mixtures thereof.

Preferable examples of the aliphatic diamine include trans-1,4-diaminocyclohexane (1000 g/L, molecular weight: 114), cis-1,4-diaminocyclohexane (1000 g/L, molecular weight: 114), 1,6-hexamethylenediamine (1000 g/L, molecular weight: 116), 1,10-decamethylenediamine (1000 g/L, molecular weight: 172), 1,3-bis(aminomethyl) cyclohexane (1000 g/L, molecular weight: 142), 1,4-bis(aminomethyl) cyclohexane (999 g/L, molecular weight: 142), polyoxypropylenediamine having a weight average molecular weight of 500 or less, and the like.

Preferable examples of the fluorine-containing aromatic diamine include 2,2'-bis(trifluoromethyl)-4,4'-diaminobiphenyl, 2,3,5,6-tetrafluoro-1,4-diaminobenzene, 2,4,5,6-tetrafluoro-1,3-diaminobenzene, 2,3,5,6-tetrafluoro-1,4-benzene(dimethaneamine), 2,2'-difluoro-(1,1'-biphenyl)-4,4'-diamine, 2,2', 6,6'-tetrafluoro-(1,1'-biphenyl)-4,4'-diamine, 4,4'-diaminooctafluorobiphenyl, 2,2-Bis(4-aminophenyl) hexafluoropropane, 4,4'-oxybis(2,3,5,6-tetrafluoroaniline) and the like.

Each of the fluorine-free aromatic diamine, the aliphatic diamine and the fluorine-containing aromatic diamine does not have to be one kind, and it may be a mixture of two or more kinds. The fluorine-free aromatic diamines may also be used in a combination of a diamine having high solubility in water and another diamine in such a way that the fluorine-free aromatic diamines as a whole have a solubility of 0.1 g/L or more in water at 25° C.

Herein, a diamine having a solubility of 0.1 g/L or more in water at 25° C. (solubility in water with 25° C.) means that 0.1 g or more of the diamine can be dissolved in 1 L (1000 ml) of water with 25° C. Solubility in water at 25° C. means the limit amount (g) of the substance that is dissolved in 1 L (liter) of water with 25° C. This value can be easily searched by SciFinder®, which is known as a search service based on databases such as chemical abstracts. In the present application, the value at pH 7 calculated by Advanced Chemistry Development (ACD/Labs) Software VI 1.02 (Copyright 1994-2011 ACD/Labs) was employed among the solubilities under various conditions.

From the characteristics of the obtained polyimide, A in chemical formula (II), which is a structural unit derived from a fluorine-free aromatic tetracarboxylic acid, is preferably any one or more of the following chemical formulas (II-2) to (II-7), particularly preferably, mainly any one or more of the following chemical formulas (II-2), (II-3) and (II-5), and further more preferably any one or more of the following chemical formulas (II-2) to (II-3).

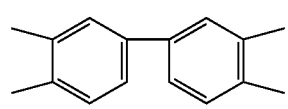

chemical formula (II-2)

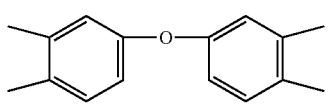

chemical formula (II-3)

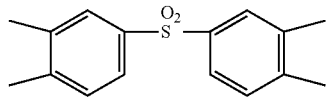

chemical formula (II-4)

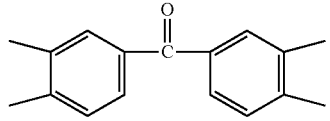

chemical formula (II-5)

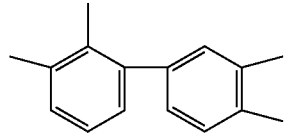

chemical formula (II-6)

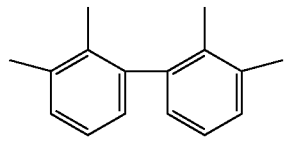

chemical formula (II-7)

From the characteristics of the obtained polyimide, B in chemical formula (II), which is a structural unit derived from a fluorine-free aromatic diamine, is preferably one or more of the following chemical formulas (II-8) to (II-9).

chemical formula (II-8)

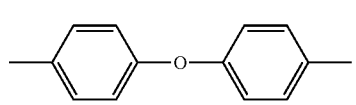

chemical formula (II-9)

Among the polyamic acids consisting of repeating units represented by the chemical formula (II), polyamic acids consisting of repeating units represented by any of the following chemical formulas (II-a) to (II-c) are particularly preferable.

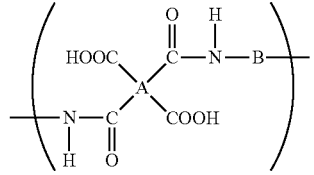

chemical formula (II-a)

In chemical formula (II-a),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine having a solubility of 0.1 g/L or more in water at 25° C., a divalent group obtainable by removing amino groups from an aliphatic diamine having a molecular weight of 500 or less, and a divalent group obtainable by removing amino groups from a fluorine-containing aromatic diamine;

wherein 50 mol % or more of A is a tetravalent group obtainable by removing carboxyl groups from an aliphatic tetracarboxylic acid and/or a tetravalent group obtainable by removing carboxyl groups from a fluorine-containing aromatic tetracarboxylic acid, and 50 mol % or less is a tetravalent group obtainable by removing carboxyl groups from a fluorine-free aromatic tetracarboxylic acid; and/or 50 mol % or more of B is a divalent group obtainable by removing amino groups from an aliphatic diamine having a molecular weight of 500 or less and/or a divalent group obtainable by removing amino groups from a fluorine-containing aromatic diamine, and 50 mol % or less is a divalent group obtainable by removing amino groups from a fluorine-free aromatic diamine having a solubility of 0.1 g/L or more in water at 25° C.

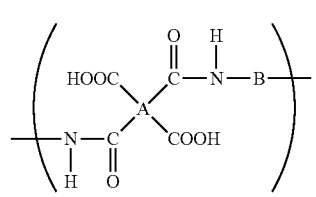

chemical formula (II-b)

In chemical formula (II-b),

A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine having a solubility of 0.1 g/L or more in water at 25° C., a divalent group obtainable by removing amino groups from an aliphatic diamine having a molecular weight of 500 or less, and a divalent group obtainable by removing amino groups from a fluorine-containing aromatic diamine.

wherein more than 50 mol % of A is a tetravalent group obtainable by removing carboxyl groups from a fluorine-free aromatic tetracarboxylic acid, and less than 50 mol % is a tetravalent group obtainable by removing carboxyl groups from an aliphatic tetracarboxylic acid and/or a tetravalent group obtainable by removing carboxyl groups from a fluorine-containing aromatic tetracarboxylic acid; and/or more than 50 mol % of B is a divalent group obtainable by removing amino groups from a fluorine-free aromatic diamine having a solubility of 0.1 g/L or more in water at 25° C., and less than 50 mol % is a divalent group obtainable by removing amino groups from an aliphatic diamine having a molecular weight of 500 or less and/or a divalent group obtainable by removing amino groups from a fluorine-containing aromatic diamine; and wherein a combination of an aromatic carboxylic acid and an aromatic diamine alone is excluded.

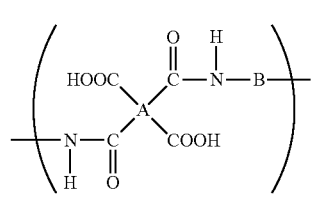

chemical formula (II-c)

In chemical formula (II-c),

A is a tetravalent group obtainable by removing the carboxyl group from an aromatic tetracarboxylic acid, and B is a divalent group obtainable by removing amino groups from an aromatic diamine having a solubility of 0.1 g/L or more in water at 25° C.

The polyamic acid consisting of the repeating unit represented by chemical formula (II) is obtained by reacting a tetracarboxylic acid component (tetracarboxylic dianhydride) with a diamine component.

In the preparation of the polyamic acid consisting of the repeating unit represented by chemical formula (II-a), at least one of the tetracarboxylic acid component (A) and the diamine component (B) described below are used.

(A) tetracarboxylic acid component in which 50 mol % or less is a fluorine-free aromatic tetracarboxylic dianhydride, and 50 mol % or more is an aliphatic tetracarboxylic dianhydride and/or a fluorine-containing aromatic tetracarboxylic dianhydride.

(B) diamine component in which 50 mol % or less is a fluorine-free aromatic diamine having a solubility of 0.1 g/L or more in water at 25° C., and 50 mol % or more is an aliphatic diamine having a molecular weight of 500 or less and/or a fluorine-containing aromatic diamine.

The amount of the fluorine-free aromatic tetracarboxylic dianhydride in the tetracarboxylic acid component (A) is not particularly limited as long as it is 50 mol % or less, but more preferably it is 10 mol % or more and 40 mol % or less from a view point of the properties of the obtained polyimide. The amount of the aliphatic tetracarboxylic dianhydride containing no fluorine and/or the fluorine-containing aromatic tetracarboxylic dianhydride in the tetracarboxylic acid component (A) is not particularly limited as long as it is 50 mol % or more, but more preferably it is 60 mol % or more and 90 mol % or less from a view point of the properties of the obtained polyimide. The amount of the fluorine-free aromatic diamine having a solubility of 0.1 g/L or more in water at 25° C. in the diamine component (B) is not particularly limited as long as it is 50 mol % or less, but more preferably it is 10 mol % or more and 40 mol % or less from a view point of the properties of the obtained polyimide. The amount of the aliphatic diamine having a molecular weight of 500 or less and/or the fluorine-containing aromatic diamine in the diamine component (B) is not particularly limited as long as it is 50 mol % or more, but more preferably it is 60 mol % or more and 90 mol % or less from a view point of the properties of the obtained polyimide.

In the preparation of the polyamic acid consisting of the repeating unit represented by chemical formula (II-b), the tetracarboxylic acid component (A) and the diamine component (B) described below are used.

(A) tetracarboxylic acid component in which more than 50 mol % is a fluorine-free aromatic tetracarboxylic dianhydride, and less than 50 mol % is an aliphatic tetracarboxylic dianhydride and/or a fluorine-containing aromatic tetracarboxylic dianhydride.

(B) diamine component in which more than 50 mol % is a fluorine-free aromatic diamine having a solubility of 0.1 g/L or more in water at 25° C., and less than 50 mol % is an aliphatic diamine having a molecular weight of 500 or less and/or a fluorine-containing aromatic diamine.

In the preparation of the polyamic acid consisting of the repeating unit represented by chemical formula (II-b), at least one of a tetracarboxylic acid component (A) comprising an aliphatic tetracarboxylic dianhydride and/or a fluorine-containing aromatic tetracarboxylic dianhydride and a diamine component (B) comprising an aliphatic diamine having a molecular weight of 500 or less and/or a fluorine-containing aromatic diamine is used so as to exclude a combination of an aromatic carboxylic acids and an aromatic diamine alone.

The amount of the fluorine-free aromatic tetracarboxylic dianhydride in the tetracarboxylic acid component (A) is not particularly limited as long as it is more than 50 mol %, but more preferably it is more than 50 mol % and 80 mol % or less from a view point of the properties of the obtained polyimide.

The amount of the aliphatic tetracarboxylic dianhydride and/or the fluorine-containing aromatic tetracarboxylic dianhydride in the tetracarboxylic acid component (A) is not particularly limited as long as it is less than 50 mol %, but more preferably it is 20 mol % or more and less than 50 mol % from a view point of the properties of the obtained polyimide. The amount of the fluorine-free aromatic diamine having a solubility of 0.1 g/L or more in water at 25° C. in the diamine component (B) is not particularly limited as long as it is more than 50 mol %, but more preferably it is 60 mol % or more and 90 mol % or less from a view point of the properties of the obtained polyimide. The amount of the aliphatic diamine having a molecular weight of 500 or less and/or the fluorine-containing aromatic diamine in the diamine component (B) is not particularly limited as long as it is less than 50 mol %, but more preferably it is 10 mol % or more and 40 mol % or less from a view point of the properties of the obtained polyimide.

In the preparation of the polyamic acid consisting of the repeating unit represented by chemical formula (II-c), the tetracarboxylic acid component is an aromatic tetracarboxylic dianhydride, and the diamine component is a fluorine-free aromatic diamine having a solubility of 0.1 g/L or more in water at 25° C.

Further, a polyamic acid consisting of a repeating unit represented by the above chemical formula (III) is also preferable.

10 to 100 mol % of A in chemical formula (III) is preferably a tetravalent group represented by the above chemical formula (III-2). 90 to 0 mol % of A in chemical formula (III) is preferably a tetravalent group represented by the above chemical formula (III-3) and/or the above chemical formula (III-4).

B in chemical formula (III) is preferably selected from the group consisting of the following chemical formula (III*5), the following chemical formula (III-6), the following chemical formula (III*7), and the following chemical formula (III-8).

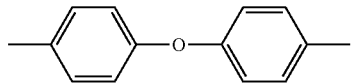

chemical formula (III-5)

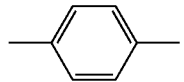

chemical formula (III-6)

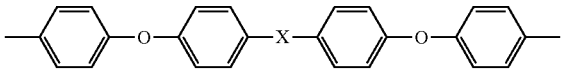

chemical formula (III-7)

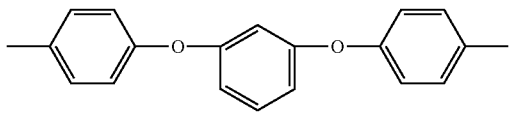

chemical formula (III-8)

In the above chemical formula (III-7), X is any one of direct bond, oxygen atom, sulfur atom, methylene group, carbonyl group, sulfoxyl group, sulfone group, 1,1'-ethylidene group, 1,2-ethylidene group, 2,2'-isopropylidene group, 2,2'-hexafluoroisopropylidene group, cyclohexylidene group, phenylene group, 1,3*phenylenedimethylene group, 1,4-phenylenedimethylene group, 1,3-phenylenediethylidene group, 1,4-phenylenediethylidene group, 1,3-phenylenedipropylidene group, 1,4-phenylenedipropylidene group, 1,3-phenylenedioxy group, 1,4-phenylenedioxy group, biphenylenedioxy group, methylenediphenoxy group, ethylidenediphenoxy group, propylidenediphenoxy group, hexafluoropropylidenediphenoxy group, oxydiphenoxy group, thiodiphenoxy group, and sulfondiphenoxy group.

The polyamic acid consisting of the repeating unit represented by the chemical formula (III) is obtained by reacting a tetracarboxylic acid component (tetracarboxylic dianhydride) with a diamine component.

The tetracarboxylic acid component is, based on 100 mol % of the total tetracarboxylic acid component, preferably consisting of 10 to 100 mol %, more preferably 10 to 90 mol %, more preferably 15 to 70 mol %, still more preferably 20 to 50 mol % of 4,4'-oxydiphthallic acids, and preferably 90 to 0 mol %, more preferably 90 to 10 mol %, more preferably 85 to 30 mol %, and more preferably 80 to 50 mol % of 3,3',4,4'-biphenyltetracarboxylic acids and/or pyromellitic acids.

The diamine component is an aromatic diamine having 1 to 4 aromatic rings, and preferable specific examples thereof include aromatic diamines having one aromatic ring such as p-phenylenediamine, m-phenylenediamine, 2,4-diaminotoluene, 2,4-bis(β-amino-tertiary butyl)toluene, bis-p-(1,1-dimethyl-5-amino-pentyl) benzene, 1-isopropyl-2,4-m-phenylenediamine, m-xylylene diamine, p-xylylene diamine: aromatic diamines having two aromatic rings such as 4,4'-diaminodiphenyl ether, 4,4'-diaminodiphenylmethane, 3,3'-diaminodiphenylmethane, 3,3'-dichlorobenzidine, 4, 4'-diaminodiphenylsulfide, 3,3'-diaminodiphenylsulfone, 1,5-diaminonaphthalene, 3,3'-dimethyl-4,4'-biphenyldiamine, benzidine, 3,3'-dimethylbenzidine, 3, 3'-dimethoxybenzidine, 4,4'-diaminodiphenylsulfone, 4,4'-diaminodiphenylpropane, bis(4-amino-3-carboxyphenyl)methane, bis(p-β-amino-tertiary butylphenyl)ether; aromatic diamines having three aromatic rings such as 1,3*bis(4-aminophenoxy)benzene, 1,4-bi (4-aminophenoxy)benzene, and bis(p-β-methyl-6-aminophenyl)benzene; and aromatic diamines having 4 aromatic rings such as 2,2-bis[4-(4-aminophenoxy) phenyl] propane, bis[4-(4-aminophenoxy)phenyl]sulfone, and 4,4'- bis(4-aminophenoxy)biphenyl; or alternatively aromatic diisocyanates having 1 to 4 aromatic rings corresponding to these.

Further, the aromatic diamines having four aromatic rings also preferably include aromatic diamines represented by the following chemical formula.

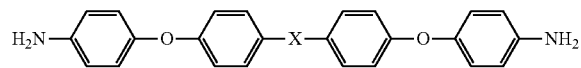

In the formula, X is a direct bond, oxygen atom, sulfur atom, methylene group, carbonyl group, sulfoxyl group, sulfone group, 1,1'-ethylidene group, 1,2-ethylidene group, 2,2'-isopropylidene group, 2,2'-hexafluoroisopropylidene group, cyclohexylidene group, phenylene group, 1,3-phenylenedimethylene group, 1,4-phenylenedimethylene group, 1,3-phenylene diethylidene group, 1,4-phenylenediethylidene group, 1,3-phenylenedipropylidene group, 1,4-phenylenedipropylidene group, 1,3-phenylenedioxy group, 1,4-phenylenedioxy group, biphenylenedioxy group, methylenediphenoxy group, ethylidenediphenoxy group, propylidenediphenoxy group, hexafluoropropylidenediphenoxy group, oxydiphenoxy group, thiodiphenoxy group, or sulfondiphenoxy group.

As the diamine component, particularly preferred among these are p-phenylenediamine, 4,4'-diaminodiphenyl ether, 2,2-bis[4-(4-aminophenoxy)phenyl]propane, bis[4-(4-aminophenoxy)phenyl]sulfone, 4,4'-bis(4-aminophenoxy)biphenyl or diisocyanates corresponding to these diamines.

The electrode binder resin composition of the present invention comprises a water-soluble polymer in addition to the polyamic acid. By combining the polyamic acid and the water-soluble polymer in the electrode binder resin composition of the present invention, the cycle characteristics of the obtained battery can be improved.

The water-soluble polymer is not particularly limited, and examples thereof include anionic polymers, cationic polymers, and nonionic polymers, and among these, anionic polymers are particularly preferable. Examples of the anionic polymer include polyacrylic acid, polymethacrylic acid, polysulfonic acid, and salts thereof. In addition, those that can be used include water-soluble cellulose derivatives such as carboxyalkyl cellulose (for example, carboxymethyl cellulose) and hydroxyalkyl cellulose (for example, hydroxyethyl cellulose and hydroxypropyl cellulose); polyvinyl alcohol, polyalkylene glycol, polyvinylpyrrolidone, salts thereof, alginic acid salts and the like. As described above, Patent Document 4 describes the use of polyacrylic acid as a binder for electrodes together in combination with polyamic acid, but there is no description or suggestion of using other water-soluble polymers. Further, Patent Document 4 describes the use of N-methyl-2-pyrrolidone which is an organic solvent as a binder solvent, but there is no description or suggestion about the use of solvents containing water.

The amount of the polyamic acid and the water-soluble polymer in the electrode binder resin composition is not particularly limited. The total amount of the polyamic acid and the water-soluble polymer is preferably more than 5% by mass to 45% by mass, more preferably more than 10% by mass to 40% by mass, still more preferably more than 15% by mass to 30% by mass, based on the total amount of the electrode binder resin composition. If the solid content concentration is lower than 5% by mass, the viscosity of the solution may become too low, and if it is higher than 45% by mass, the fluidity of the solution may be lost. The solution viscosity at 30° C. is preferably 1000 Pa·sec or less, more preferably 0.5 to 500 Pa·sec, still more preferably 1 to 300 Pa·sec, and particularly preferably 3 to 200 Pa·sec. If the solution viscosity exceeds 1000 Pa sec, mixing of an electrode active material powder and uniform application thereof on the current collector may become difficult. If it is lower than 0.5 Pa·sec, sagging or the like during mixing of an electrode active material powder and application thereof on the current collector may occur, and there is a risk that the toughness of the binder may decrease.

The ratio of the polyamic acid to the water-soluble polymer is not particularly limited. The mass ratio of the polyamic acid to the water-soluble polymer (polyamic acid: water soluble polymer) in the electrode binder resin composition is preferably 1:99 to 99:1, more preferably 10:90 to 90:10, and still more preferably from 20:80 to 80:20. If the mass ratio of the polyamic acid to the water-soluble polymer is within the above range, the resulting battery will have higher cycle properties.

The electrode binder resin composition of the present invention comprises a solvent. The solvent is not particularly limited, but preferred are those capable of dissolving at least a part of the polyamic acid and/or the water-soluble polymer. The electrode binder resin composition may be a slurry or a solution. For example, water, an organic solvent, or a mixture thereof can be used as a solvent for the electrode binder resin composition. In particular, the solvent preferably contains water, which has good environmental adaptability. The content of water in the solvent is preferably 50% by mass or more, more preferably 70% by mass or more, still more preferably 90% by mass or more, and may be 100% by mass.

The solvent of the electrode binder resin composition may be a known solvent for polyamic acids, a known solvent for water-soluble polymers, or a mixture thereof.

Examples of the solvent for the polyamic acid include solvents used for preparing the polyamic acid. Hereinafter, the solvents used for the preparation of the polyamic acid will be described together with the method for preparing the polyamic acid.

A polyamic acid, particularly a polyamic acid consisting of a repeating unit represented by the chemical formula (II), can be easily prepared by reacting a tetracarboxylic acid component and a diamine component in water as a solvent in the presence of imidazoles. In this case, an organic solvent other than water may be used in a proportion of preferably 50% by mass or less, more preferably 30% by mass or less, still more preferably 10% by mass or less in the total solvent.

Examples of the organic solvent used with water include N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphortriamide, 1,2-dimethoxyethane, bis(2-methoxyethyl) ether, 1,2-bis(2-methoxyethoxy)ethane, tetrahydrofuran, bis[2-(2-methoxyethoxy)ethyl]ether, 1,4-dioxane, dimethyl sulfoxide, dimethyl sulfone, diphenyl ether, sulfolane, diphenyl sulfone, tetramethylurea, anisole, m-cresol, phenol, γ-butyrolactone, and the like.

Examples of the imidazoles (compounds) preferably include compounds of the following chemical formula (10).

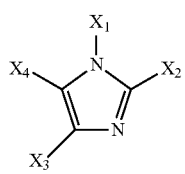

chemical formula (10)

In chemical formula (10), $X_1$ to $X_4$ are independently hydrogen atoms or alkyl groups having 1 to 5 carbon atoms.

The imidazoles used in the present invention preferably have a solubility of 0.1 g/L or more, particularly 1 g/L or more in water at 25° C.

Further, in the imidazoles of the chemical formula (10), more preferred imidazoles are those in which $X_1$ to $X_4$ are independently hydrogen atoms or alkyl groups having 1 to 5 carbon atoms and at least two of $X_1$ to $X_4$ are alkyl groups having 1 to 5 carbon atoms, that is, imidazoles having two or more alkyl groups as substituents.

Since imidazoles having two or more alkyl groups as substituents have a high solubility in water, a polyimide precursor aqueous solution composition can be easily produced by using them. Suitable examples of these imidazoles include 1,2-dimethylimidazole (solubility is 239 g/L in water at 25° C., the same applies hereinafter), 2-ethyl-4-methylimidazole (1000 g/L), 4-ethyl-2-methyl imidazole (1000 g/L), 1-methyl-4-ethylimidazole (54 g/L) and the like.

Solubility in water at 25° C. means the limit amount (g) of the substance that is dissolved in 1 L (liter) of water with 25° C. This value can be easily searched by SciFinder®, which is known as a search service based on databases such as chemical abstracts. In the present application, the value at pH 7 calculated by Advanced Chemistry Development (ACD/Labs) Software VI 1.02 (Copyright 1994-2011 ACD/Labs) was employed among the solubilities under various conditions.

The imidazoles may be used alone or may be a mixture of two or more kinds. In the present specification, imidazoles, particularly imidazoles represented by formula (10), are not included in the "organic solvent". In addition, amine compounds other than imidazoles (preferably other than imidazoles represented by formula (10)), particularly compounds in a liquid form and dissolved in a solvent, are regarded as a kind of organic solvents.

The amount of imidazoles used in the present invention is preferably 0.8 times equivalent or more, more preferably 1.0 times equivalent or more, still more preferably 1.2 times equivalent or more, relative to the carboxyl group of the polyamic acid. If the amount of imidazoles used is less than 0.8 times equivalent of the carboxyl group of the polyamic acid, it may not be easy to obtain a uniformly dissolved polyamic acid in some cases. The upper limit of the amount of imidazoles used is not particularly limited, but is usually less than 10 times equivalent, preferably less than 5 times equivalent, and more preferably less than 3 times equivalent. If the amount of imidazoles used is too large, it may be uneconomical and the storage stability of the polyamic acid and the electrode binder resin composition may be deteriorated.

In the present invention, the equivalent to the carboxyl group in the polyamic acid that defines the amount of imidazoles is the ratio of the number (number of molecules) of the imidazoles to one carboxyl group forming an amide acid group of the polyamic acid. The number of carboxyl groups forming the amide acid group of the polyamic acid is calculated assuming that two carboxyl groups are formed per molecule of the tetracarboxylic acid component of the starting material.

Therefore, the amount of imidazoles used is preferably 0.8 times by mole or more, more preferably 1.6 times by mole, more preferably 2.0 times by mole or more, and particularly preferably 2.4 times by mole or more, based on a tetracarboxylic dianhydride as a starting material (i.e. relative to a tetracarboxylic acid component of the polyamic acid).

The imidazoles not only have a function to form a salt with the carboxyl group of the polyamic acid (polyimide precursor) produced by the reaction of tetracarboxylic acid dianhydride and diamine to increase the solubility in water, but also have an extremely high catalytic function for the imidization (dehydration and ring-closure) of the polyimide precursor to form a polyimide. When an electrode binder resin composition containing imidazoles is used, it is possible to obtain a binder having extremely high physical properties, for example, even by heat treatment at a lower temperature for a short time.

As described above, by reacting the tetracarboxylic acid component and the diamine component using water as a reaction solvent in the presence of imidazoles, preferably in the presence of imidazoles having two or more alkyl groups as substituents, a polyamic acid can be produced extremely easily.

Using substantially an equimolar amount of the tetracarboxylic acid component (tetracarboxylic dianhydride) and the diamine component, the reaction is carried out at a relatively low temperature of 100° C. or lower, preferably 80° C. or lower in order to suppress the imidization reaction. Although not limited, the reaction temperature is usually 25° C. to 100° C., preferably 40° C. to 80° C., more preferably 50° C. to 80° C., and the reaction time is about 0.1 to 24 hours, preferably about 2 to 12 hours. By setting the reaction temperature and the reaction time within the above ranges, a high molecular weight polyimide precursor aqueous solution composition can be easily obtained with high production efficiency. Although the reaction can be carried out in an air atmosphere, it is usually preferably carried out in an inert gas atmosphere, preferably in a nitrogen gas atmosphere.

Further, the tetracarboxylic acid component (tetracarboxylic dianhydride) and the diamine component are substantially equimolar, and specifically, the molar ratio [tetracarboxylic acid component/diamine component] is about 0.90 to 1.10, and preferably about 0.95 to 1.05.

The polyamic acid can also be prepared by reacting a tetracarboxylic acid component and a diamine component in an organic solvent. For example, the polymerization reaction can be carried out by adding the tetracarboxylic acid component at one time or in multiple steps to a solution in which the diamine component is dissolved in an organic solvent. The reaction temperature is preferably 10° C. to 60° C., more preferably 15° C. to 55° C., and particularly preferably 15° C. to 50° C. If the reaction temperature is lower than 10° C., the reaction will be slow, which is not preferable, and if it is higher than 60° C., the viscosity of the solution may be low in some cases, which is not preferable. The reaction time is preferably in the range of 0.5 hours to 72 hours, more preferably 1 hour to 60 hours, and particularly preferably 1.5 hours to 48 hours. If the reaction time is shorter than 0.5 hours, the reaction may not proceed sufficiently and the viscosity of the synthesized polyamic acid solution may become unstable. On the other hand, it is not preferable to spend 72 hours or more from the viewpoint of productivity.

Examples of the organic solvent include N, N-dimethylformamide, N, N-dimethylacetamide, N, N-diethylacetamide, N-methyl-2-pyrrolidone, N-ethyl-2-pyrrolidone, 1,3-dimethyl-2-imidazolidinone, N-methylcaprolactam, hexamethylphosphortriamide, 1,2-dimethoxyethane, bis(2-methoxyethyl) ether, 1,2-bis(2-methoxyethoxy)ethane, tetrahydrofuran, bis[2-(2-methoxyethoxy) ethyl]ether, 1,4-dioxane, dimethyl sulfoxide, dimethyl sulfone, diphenyl ether, sulfolane, diphenyl sulfone, tetramethylurea, anisole, m-cresol, phenol and γ butyrolactone. These organic solvents may be used alone or in combination of two or more. Among these, due to the solubility of polyamic acid and safety, N, N-dimethylacetamide, N, N-diethylacetamide, N-methyl-2-pyrrolidone, N-ethyl-2-pyrrolidone, 1,3-dimethyl-2-imidazolidinone and γ-butyrolactone are preferable, and N-methyl-2-pyrrolidone, N-ethyl-2-pyrrolidone and γ-butyrolactone are particularly preferable.

The organic solvent preferably contains a pyridine compound. As a result, the degree of swelling of the obtained polyimide resin with respect to the electrolytic solution can be made smaller, and the elongation at break and breaking energy can be made larger. In addition, the heat treatment temperature for obtaining the electrodes can be lowered.

Pyridine compounds are compounds having a pyridine skeleton in their chemical structure, and preferred examples thereof include pyridine, 3-pyridinol, quinoline, isoquinoline, quinoxaline, 6-tertbutylquinoline, acridine, 6-quinoline carboxylic acid, 3,4-lutidine, pyridazine, and the like. These pyridine compounds may be used alone or in combination of two or more.

The amount of the pyridine compound added is not limited, but is preferably 0.05 to 2.0 molar equivalents, more preferably 0.1 to 1.0 molar equivalent, with respect to the amic acid structure of the polyamic acid (per one mole of the amic acid structure). When the addition amount is out of this range, it may be difficult to obtain the effect of adding similar compounds, namely, the swelling degree of the binder with respect to the electrolytic solution is made smaller, the elongation at break and breaking energy of the obtained polyimide resin are made larger, and the heat treatment temperature for obtaining the electrode can be lowered.

The polyamic acid prepared as described above is obtained as a solution. The obtained polyamic acid solution may be used in the electrode binder resin composition. The obtained polyamic acid solution may be further diluted and used in the electrode binder resin composition. Further, the polyamic acid may be isolated, for example, by pouring it in a poor solvent to precipitate it. The isolated polyamic acid may be mixed with the solvent again and used in the electrode binder resin composition. From the viewpoint of productivity and cost, it is preferable to use the obtained polyamic acid solution as it is without isolation.

It is preferable to use an appropriate solvent depending on the type of polyamic acid. For example, in the case of a polyamic acid consisting of a repeating unit represented by the above chemical formula (II), the solvent may be an organic solvent or an aqueous solvent (water or a solvent containing water), but a water based solvent is preferable because it has a good environmental adaptability. For example, in the case of a polyamic acid consisting of repeating units represented by the above chemical formula (III), the solvent is preferably an organic solvent.

Examples of the solvent for the water-soluble polymer include water, methanol, ethanol, ethylene glycol, acetone, dimethylformamide, dimethylacetamide, and mixtures thereof.

The content of the solvent in the electrode binder resin composition is not particularly limited and may be adjusted as appropriate. In one embodiment of the present invention, the electrode binder resin composition preferably contains a solvent in an amount that dissolves at least a part (for example, 30% by mass or more) of the polyamic acid and/or the water-soluble polymer. In particular, it is preferable that the electrode binder resin composition contains a solvent in an amount that dissolves the entire amount of the polyamic acid and the water soluble polymer. The amount of the solvent is preferably 55% by mass to 95% by mass, more preferably 60% by mass to 90% by mass, and further preferably 70% by mass to 90% by mass, based on the total amount of the electrode binder resin composition.

The electrode binder resin composition is prepared by mixing a polyamic acid and a water-soluble polymer in the presence of a solvent. A polyamic acid solution and a water-soluble polymer solution may be mixed to obtain an electrode binder resin composition. An isolated water-soluble polymer may be added to a polyamic acid solution to prepare an electrode binder resin composition. An isolated polyamic acid may be added to a water-soluble polymer solution to prepare an electrode binder resin composition.

The electrode mixture paste can be suitably prepared by mixing an electrode active material with the electrode binder resin composition of the present invention in a temperature range of 10° C. to 60° C., although the electrode active material is not limited. Known electrode active materials may be preferably used, but preferred are lithium-containing metal composite oxides, carbon powders, silicon powders, tin powders, silicon or tin oxide powders, or alloy powders containing silicon or tin. The amount of the electrode active material in the electrode mixture paste is not limited, but is usually 0.1 to 1000 times, preferably 1 to 1000 times, more preferably 5 to 1000 times, further preferably 10 to 1000 times, based on the solid mass content of the polyamic acid and the water-soluble polymer. If the amount of the active material is too small, the active material layer formed on the current collector has many inactive portions, and the function as an electrode may be insufficient. Further, if the amount of the active material is too large, the active material is not sufficiently bound to the current collector and easily falls off. Additives such as a surfactant, a viscosity modifier, and a conductive agent may be added to the electrode mixture paste, if necessary. Further, it is preferable to mix the polyamic acid and the water-soluble polymer so as to be 1 to 15% by mass in the total solid content of the electrode mixture paste. In this range, more suitable battery performance can be obtained.

In one embodiment, the electrode is obtained by applying the electrode mixture paste to a current collector, removing the solvent, and converting the polyamic acid to polyimide. The electrode comprises an active material layer containing polyimide, a water-soluble polymer, and an electrode active material, and a current collector. Batteries using this electrode are excellent in cycle characteristics such as initial charge/discharge efficiency and capacity retention rate. A polyamic acid is easily converted to a polyimide by heat treatment or chemical treatment using an imidizing agent and the like.

In the heat treatment, generally, after the electrode mixture paste is applied onto the current collector, it is dried in a range of 50° C. to 180° C., and then further heated at 200° C. to 400° C. for 5 minutes to 10 hours to convert the polyamic acid into the polyimide. When imidazoles or pyridine compounds are contained, the polyamic acid can be converted to polyimide at a relatively low temperature (for example, 120° C. to 300° C., preferably 150° C. to 250° C.).

In one aspect of the present embodiment, the heating temperature in the heat treatment is preferably 200° C. or lower. By setting the heating temperature to 200° C. or lower, deterioration of the current collector is suppressed. The polyamic acid consisting of the repeating unit represented by the chemical formula (I), particularly the polyamic acid consisting of the repeating unit represented by the chemical formula (III), is converted into a polyimide having excellent properties by heat treatment at such a low temperature. Further, as described above, in the presence of imidazoles or pyridine compounds, the polyamic acid can be converted into a polyimide having excellent properties even by heat treatment at such a low temperature. The heating temperature is preferably 80° C. to 200° C., preferably 90° C. to 180° C., and more preferably 100° C. to 150° C. If the heating temperature is less than 80° C., the imidization reaction may not proceed sufficiently or the physical properties of the electrode formed product may deteriorate. Further, if the heating temperature exceeds 200° C., the current collector may deteriorate. The heat treatment may be carried out by a method of raising the temperature stepwise in multiple stages in order to prevent foaming and powdering.

The heat treatment time is preferably in the range of 10 minutes to 48 hours. More than 48 hours is not preferable from the viewpoint of productivity, and if it is shorter than 10 minutes, the imidization reaction and removal of the solvent may be insufficient. During this time, most of the solvent is removed and the polyamic acid becomes substantially polyimide by the imidization reaction. The heat treatment may be preferably performed under reduced pressure conditions or under inert gas flow conditions in order to efficiently remove the solvent.

The electrode in which the electrode binder resin composition of the present invention is used may be a positive electrode. For the positive electrode, an electrode active material such as a lithium-containing metal composite oxide capable of reversibly inserting and releasing lithium ions by charging and discharging may be used. The prepared electrode mixture paste is cast or applied onto a conductive current collector such as aluminum. After that, the current collector and the electrode mixture paste are heat-treated to remove the solvent and carry out an imidization reaction to obtain a positive electrode.

The electrode in which the electrode binder resin composition of the present invention is used may be a negative electrode. For the negative electrode, an electrode active material such as carbon powder, for example graphite, silicon powder, tin powder, oxide powder of silicon or tin, or alloy powder containing silicon or tin capable of reversibly inserting and releasing lithium ions by charging and discharging may be used. The prepared electrode mixture paste is cast or applied onto a conductive current collector such as copper. After that, the current collector and the electrode mixture paste are heat-treated to remove the solvent and carry out an imidization reaction to obtain a negative electrode.

The obtained electrode can be suitably used to manufacture a battery according to a known method. For example, the obtained positive electrode and negative electrode are wound into a cylindrical shape while sandwiching a separator such as a polyolefin porous material. The cylindrical electrode product, as it is or after squeezed into a flat shape, is inserted in an outer package with a non-aqueous electrolyte solution to suitably obtain a battery.

EXAMPLES

Hereinafter, the present invention will be described in more detail with reference to examples and comparative examples, but the present invention is not limited to these examples.

The abbreviations of compounds used in the following examples will be described.

UPIA-LB-2001: Polyamic acid varnish (solvent:water), manufactured by Ube Industries, Ltd.
PAANa: Sodium polyacrylate
SBR: Styrene-butadiene rubber
CMC: Carboxymethyl cellulose
PMDA: Pyromellitic dianhydride
ODA: 4,4'-diaminodiphenyl ether Example 1

Elemental silicon (Si) and artificial graphite were blended so that a negative electrode active material has a capacity of 400 mAh/g. The negative electrode active material were blended with UPIA-LB-2001 and PAANA (polyamic acid mass: PAANA mass=20:80), as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm$^2$.

A battery was manufactured using lithium foil for a counter electrode and the charge/discharge cycle characteristics of the battery were confirmed. The capacity retention rate after 50 cycles was 97%. The initial charge/discharge efficiency was 90%.

Example 2

Silicon oxide (SiO) and artificial graphite were blended so that a negative electrode active material has a capacity of 400 mAh/g. The negative electrode active material were blended with UPIA-LB-2001 and PAANA (polyamic acid mass: PAANA mass=20:80), as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm$^2$.

A battery was manufactured using lithium foil for a counter electrode and the charge/discharge cycle characteristics of the battery were confirmed. The capacity retention rate after 50 cycles was 95%. The initial charge/discharge efficiency was 81%.

Example 3

Elemental silicon (Si), silicon oxide (SiO) and artificial graphite were blended so that a negative electrode active material has a capacity of 600 mAh/g. The negative electrode active material were blended with UPIA-LB-2001 and PAANA (polyamic acid mass: PAANA mass=20:80), as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm².

A battery was manufactured using lithium foil for a counter electrode and the charge/discharge cycle characteristics of the battery were confirmed. The capacity retention rate after 20 cycles was 100%. The initial charge/discharge efficiency was 84%.

Example 4

Elemental silicon (Si), silicon oxide (SiO) and artificial graphite were blended so that a negative electrode active material has a capacity of 800 mAh/g. The negative electrode active material were blended with UPIA-LB-2001 and PAANA (polyamic acid mass: PAANA mass=20:80), as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm².

A battery was manufactured using lithium foil for a counter electrode and the charge/discharge cycle characteristics of the battery were confirmed. The capacity retention rate after 20 cycles was 100%. The initial charge/discharge efficiency was 83%.

Example 5

Silicon oxide (SiO) and artificial graphite were blended so that a negative electrode active material has a capacity of 400 mAh/g. The negative electrode active material were blended with UPIA-LB-2001 and CMC (polyamic acid mass: CMC mass=20:80), as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm².

A battery was manufactured using lithium foil for a counter electrode and the charge/discharge cycle characteristics of the battery were confirmed. The capacity retention rate after 20 cycles was 100%. The initial charge/discharge efficiency was 82%.

Comparative Example 1

ODA and N-methyl-2-pyrrolidone (NMP) were charged in a reaction vessel replaced with nitrogen gas, and heated and stirred at 40° C. for 60 minutes to dissolve the monomer. Then, PMDA was added, and the mixture was further stirred for 4 hours to obtain an electrode binder resin composition.

This electrode binder resin composition were blended with a negative electrode active material, in which elemental silicon (Si) and artificial graphite were mixed so as to have a capacity of 400 mAh/g, in a ratio of 5:95 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm².

A battery was manufactured using lithium foil for a counter electrode and the charge/discharge cycle characteristics of the battery were confirmed. The capacity retention rate after 20 cycles was 100%, which was a good result. However, the initial charge/discharge efficiency was 74%, which was a very poor result.

Comparative Example 2

Elemental silicon (Si) and artificial graphite were blended so that a negative electrode active material has a capacity of 400 mAh/g. The negative electrode active material were blended with PAANA, as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm².

A battery was manufactured using lithium foil for a counter electrode and the charge/discharge cycle characteristics of the battery were confirmed. The capacity retention rate after 50 cycles was 90% and the initial charge/discharge efficiency was 75%, both of which were very poor results.

Comparative Example 3

Elemental silicon (Si) and artificial graphite were blended so that a negative electrode active material has a capacity of 400 mAh/g. The negative electrode active material were blended with SBR and CMC (SBR mass: CMC mass=25:75), as an electrode binder resin composition, in a ratio of 95:5 (mass %), and water was added so that the slurry concentration was about 60% by mass to prepare a negative electrode mixture paste. This negative electrode mixture paste was applied onto a copper foil, placed in a vacuum dryer, and heat-treated at 150° C. for 7 hours to prepare an electrode having a capacity density of 2 mAh/cm².

A battery was manufactured using lithium foil for a counter electrode and the charge/discharge cycle characteristics of the battery were confirmed. The initial charge/discharge efficiency was 82%, which was a good result. However, the capacity retention rate after 50 cycles was 87%, which was a very poor result.

The invention claimed is:

1. An electrode binder resin composition, comprising a polyamic acid, a water-soluble polymer other than the polyamic acid, and a solvent comprising water, wherein the polyamic acid and the water-soluble polymer other than the polyamic acid are dissolved in the solvent comprising water, and wherein the polyamic acid consists of a repeating unit represented by following chemical formula (I):

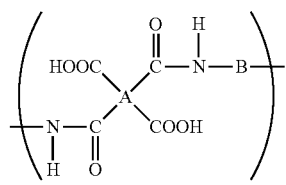

chemical formula (I)

wherein A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.

2. An electrode binder resin composition, comprising:
a polyamic acid with the proviso that the polyamic acid does not comprise a structure derived from a diamine compound represented by general formulas (I) or (II):

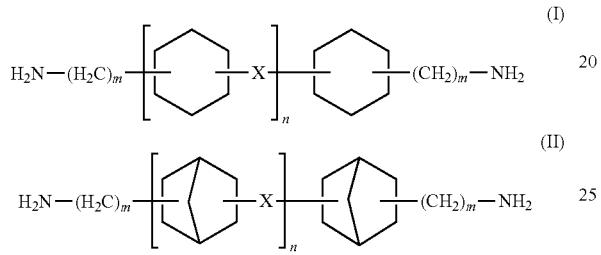

wherein in formula (I) or (II), n and two m are independently 0 or 1,
—X— is a divalent group selected from the group consisting of direct bond, —O—, —S—, —$SO_2$—, —CO—, and —$CH_2$—,
a water-soluble polymer other than the polyamic acid with the proviso that polyacrylic acid, polyethylene oxide and polypropylene oxide are excluded, and a solvent,
wherein the polyamic acid consists of a repeating unit represented by following chemical formula (I):

chemical formula (I)

wherein A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.

3. The electrode binder resin composition according to claim 1, wherein the polyamic acid consists of a repeating unit represented by following chemical formula (II), chemical formula (II)

wherein, in chemical formula (II),
A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine having a solubility of 0.1 g/L or more in water at 25° C., a divalent group obtainable by removing amino groups from an aliphatic diamine having a molecular weight of 500 or less, and a divalent group obtainable by removing amino groups from a fluorine-containing aromatic diamine.

4. The electrode binder resin composition according to claim 1, wherein the polyamic acid consists of a repeating unit represented by a following chemical formula (III), chemical formula (III)

wherein, in chemical formula (III), A is a tetravalent group obtainable by removing carboxyl groups from an aromatic tetracarboxylic acid, and comprises at least any one of tetravalent groups represented by following chemical formulas (III-2) to (III-4); and B is a divalent group having 1 to 4 aromatic rings chemical formula (III-2)

chemical formula (III-3)

chemical formula (III-4)

5. The electrode binder resin composition according to claim 2, wherein the solvent is an organic solvent.

6. The electrode binder resin composition according to claim 1, wherein the water-soluble polymer is selected from the group consisting of a water-soluble cellulose derivative, polyacrylic acid, polymethacrylic acid, polyvinyl alcohol, polyalkylene glycol, polyvinylpyrrolidone, polysulfonic acid, salts thereof, and alginic acid salt.

7. The electrode binder resin composition according to claim 2, wherein the water-soluble polymer is selected from the group consisting of a water-soluble cellulose derivative, polyvinyl alcohol, polyvinylpyrrolidone, polysulfonic acid, salts thereof, and alginic acid salt.

8. The electrode binder resin composition according to claim 1, wherein the mass ratio of the polyamic acid to the water-soluble polymer (polyamic acid:water-soluble polymer) is in a range of 10:90 to 90:10.

9. An electrode comprising:
a polyimide with the proviso that the polyimide does not comprise a structure derived from a diamine compound represented by general formulas (I) or (II):

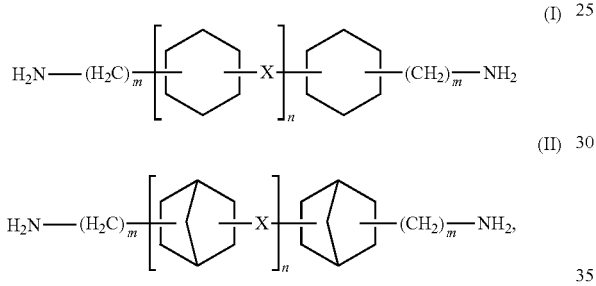

wherein in formula (I) or (II), n and two m are independently 0 or 1, —X— is a divalent group selected from the group consisting of direct bond, —O—, —S—, —SO$_2$—, —CO—, and —CH$_2$—,
a water-soluble polymer other than polyamic acid with proviso that polyacrylic acid, polyethylene oxide and polypropylene oxide are excluded, and an electrode active material,
wherein the polyimide is a polyimide obtained from a polyamic acid consisting of a repeating unit represented by following chemical formula (I):

chemical formula (I)

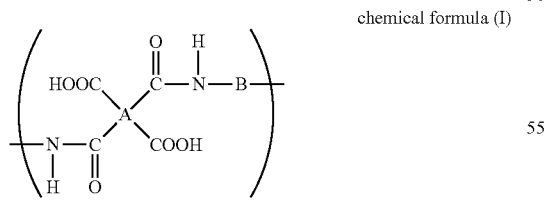

wherein A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and B is one or more groups selected from the group consisting of a divalent group obtainable by removing amino groups from a fluorine-free aromatic diamine, a divalent group obtainable by removing amino groups from an aliphatic diamine, and a divalent group obtainable by removing amino groups from a fluorine-containing aromatic diamine.

10. The electrode according to claim 9, wherein the electrode active material is carbon powder, silicon powder, tin powder, an oxide powder of silicon or tin, or alloy powders comprising silicon or tin.

11. A lithium ion secondary battery comprising the electrode according to claim 9.

12. A method for producing an electrode, comprising applying an electrode mixture paste comprising the electrode binder resin composition according to claim 1 and an electrode active material to a current collector, and then heat-treating the electrode mixture paste at 200° C. or lower to remove the solvent and perform imidization reaction of the polyamic acid.

13. The electrode binder resin composition according to claim 2, wherein the polyamic acid consists of a repeating unit represented by following chemical formula (II), chemical formula (II)

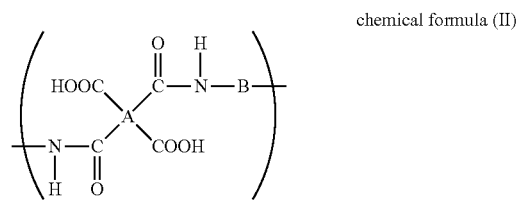

wherein, in chemical formula (II),
A is one or more groups selected from the group consisting of a tetravalent group obtainable by removing carboxyl groups from a fluorine-free aromatic tetracarboxylic acid, a tetravalent group obtainable by removing carboxyl groups from an aliphatic tetracarboxylic acid, and a tetravalent group obtainable by removing carboxyl groups from a fluorine-containing aromatic tetracarboxylic acid; and
B is one or more groups selected from the group consisting of a divalent group obtainable by removing amino groups from a fluorine-free aromatic diamine having a solubility of 0.1 g/L or more in water at 25° C., a divalent group obtainable by removing amino groups from an aliphatic diamine having a molecular weight of 500 or less, and a divalent group obtainable by removing amino groups from a fluorine-containing aromatic diamine.

14. The electrode binder resin composition according to claim 2, wherein the polyamic acid consists of a repeating unit represented by a following chemical formula (III), chemical formula (III)

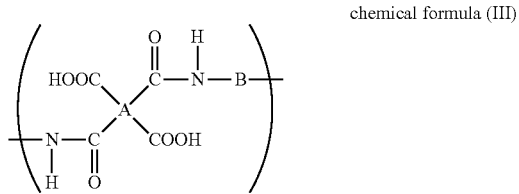

wherein, in chemical formula (III), A is a tetravalent group obtainable by removing carboxyl groups from an aromatic tetracarboxylic acid, and comprises at least any one of tetravalent groups represented by following chemical formulas (III-2) to (III-4); and B is a divalent group having 1 to 4 aromatic rings

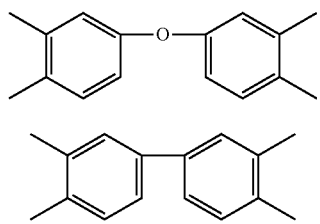

chemical formula (III-2)

chemical formula (III-3)

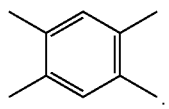

chemical formula (III-4)

15. The electrode binder resin composition according to claim 2, wherein the mass ratio of the polyamic acid to the water-soluble polymer (polyamic acid:water-soluble polymer) is in a range of 10:90 to 90:10.

16. A method for producing an electrode, comprising applying an electrode mixture paste comprising the electrode binder resin composition according to claim 2 and an electrode active material to a current collector, and then heat-treating the electrode mixture paste at 200° C. or lower to remove the solvent and perform imidization reaction of the polyamic acid.

* * * * *